US012779832B2

(12) United States Patent
Kim et al.

(10) Patent No.: US 12,779,832 B2
(45) Date of Patent: Nov. 3, 2026

(54) FOLDABLE DISPLAY DEVICE

(71) Applicant: Samsung Display Co., LTD., Yongin-si (KR)

(72) Inventors: Youngdo Kim, Suwon-si (KR); Kang-Woo Lee, Seoul (KR); Aely Oh, Hwaseong-si (KR); Jonghwan Cho, Ansan-si (KR); Seongsik Choi, Seoul (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 186 days.

(21) Appl. No.: 17/242,366

(22) Filed: Apr. 28, 2021

(65) Prior Publication Data

US 2022/0063256 A1 Mar. 3, 2022

(30) Foreign Application Priority Data

Sep. 1, 2020 (KR) ........................ 10-2020-0111310

(51) Int. Cl.

*B32B 33/00* (2006.01)
*B32B 3/10* (2006.01)
*B32B 27/30* (2006.01)
*G02B 1/14* (2015.01)

(52) U.S. Cl.

CPC ................ *B32B 33/00* (2013.01); *B32B 3/10* (2013.01); *B32B 27/30* (2013.01); *G02B 1/14* (2015.01); *B32B 2307/51* (2013.01); *B32B 2307/536* (2013.01); *B32B 2457/20* (2013.01)

(58) Field of Classification Search

CPC .. H04M 1/0266; H04M 1/0268; H04M 1/026; H01L 2251/5338; H01L 51/0097; G02B 1/14

See application file for complete search history.

(56) References Cited

U.S. PATENT DOCUMENTS

2008/0002118 A1* 1/2008 Paek ................. G02F 1/133305 349/122
2010/0226005 A1* 9/2010 Nishimoto ............. G02B 1/115 359/359
2013/0222998 A1* 8/2013 Cho ....................... G06F 1/1601 361/679.27
2014/0065326 A1* 3/2014 Lee ......................... G09F 9/301 428/12

(Continued)

FOREIGN PATENT DOCUMENTS

KR 1020170064453 A 6/2017
KR 1020170136033 A 12/2017

(Continued)

OTHER PUBLICATIONS

Korean Office Action for Korean Patent Application No. KR 10-2020-0111310 dated Feb. 10, 2026.

*Primary Examiner* — Alicia J Weydemeyer
(74) *Attorney, Agent, or Firm* — CANTOR COLBURN LLP

(57) ABSTRACT

A foldable display device includes a display panel including a folding area and a planar area which is adjacent to the folding area, a window on the display panel, and a window protective layer on the window. The window protective layer includes a restoration layer including a soft pattern corresponding to the folding area, a plastic film on the restoration layer, and a hard coating layer on the plastic film.

10 Claims, 10 Drawing Sheets

(56) References Cited

U.S. PATENT DOCUMENTS

| | | | | |
|---|---|---|---|---|
| 2014/0287213 | A1* | 9/2014 | Lee | B32B 27/36 428/217 |
| 2015/0010742 | A1* | 1/2015 | Han | B32B 27/302 428/335 |
| 2015/0043174 | A1* | 2/2015 | Han | G02F 1/13452 428/156 |
| 2015/0165720 | A1* | 6/2015 | Lim | B32B 7/12 156/221 |
| 2015/0192951 | A1* | 7/2015 | Chong | G02F 1/133305 359/894 |
| 2016/0222165 | A1* | 8/2016 | Wakita | C08G 73/1082 |
| 2016/0306392 | A1* | 10/2016 | Park | G06F 3/041 |
| 2017/0263890 | A1* | 9/2017 | Chun | H10K 50/841 |
| 2020/0159287 | A1 | 5/2020 | Jeong | |

FOREIGN PATENT DOCUMENTS

| | | | |
|---|---|---|---|
| KR | 10-1962936 | B1 | 3/2019 |
| KR | 1020200033366 | A | 3/2020 |
| KR | 1020200041042 | A | 4/2020 |
| KR | 20200059368 | A | 5/2020 |

* cited by examiner

FOLDABLE DISPLAY DEVICE

This application claims priority to Korean Patent Application No. 10-2020-0111310, filed on Sep. 1, 2020, and all the benefits accruing therefrom under 35 U.S.C. § 119, which is hereby incorporated by reference for all purposes as if fully set forth herein.

BACKGROUND

(1) Field

Embodiments of the invention relate generally to a foldable display device. More specifically, embodiments of the invention relate to a foldable display including a window protective layer.

(2) Description of the Related Art

A foldable display device may be folded. Accordingly, a window included in the foldable display is made of a flexible material. However, as the window is made of the flexible material, a display panel included in the foldable display device may not be properly protected. For example, a shape of the window may be deformed by an external force such as stamping, or the window may be worn due to repeated contact. Therefore, in order to properly protect the display panel, an improved protection function of the window is desired.

SUMMARY

Embodiments provide a foldable display device.

A foldable display device includes a display panel including a folding area and a planar area which is adjacent to the folding area, a window on the display panel, and a window protective layer on the window. The window protective layer may include in order from the window, a restoration layer (e.g., shape-restoration layer) including a soft pattern overlapping (e.g., corresponding to) the folding area, a plastic film and a hard coating layer.

According to an embodiment, the soft pattern may further overlap the planar area.

According to an embodiment, the restoration layer may further include a hard pattern overlapping the planar area.

According to an embodiment, the soft pattern may be provided in plural including a plurality of first soft pieces (e.g., first soft sub-patterns), and the restoration layer may further include a plurality of first hard pieces (e.g., first hard sub-patterns) between the first soft pieces and overlapping the folding area.

According to an embodiment, the restoration layer may further include a hard pattern overlapping the planar area.

According to an embodiment, the hard pattern may be provided in plural including a plurality of second hard pieces (e.g., second hard sub-patterns), and the restoration layer may further include a plurality of second soft pieces (e.g., second soft sub-patterns) between the second hard pieces and overlapping the planar area.

According to an embodiment, the soft pattern may include a polymer resin.

According to an embodiment, the hard coating layer may include a silicone resin and a metal oxide.

According to an embodiment, the plastic film may include a polymer resin.

According to an embodiment, the window may include a colorless polyimide.

According to an embodiment, the foldable display device may further include a protective film under the display panel, a buffer member under the protective film, and a support member under the buffer member.

A foldable display device includes a display panel including a folding area and a planar area which is adjacent to the folding area, a window on the display panel, and a window protective layer on the window. The window protective layer may include in order from the window, a plastic film, a restoration layer (e.g., shape-restoration layer) including a soft pattern overlapping the folding area, and a hard coating layer.

According to an embodiment, the soft pattern may further overlap the planar area.

According to an embodiment, the restoration layer may further include a hard pattern overlapping the planar area.

According to an embodiment, the soft pattern may be provided in plural including a plurality of first soft pieces (e.g., first soft sub-patterns), and the restoration layer may further include a plurality of first hard pieces (e.g., first hard sub-patterns) between the first soft pieces and overlapping the folding area.

According to an embodiment, the restoration layer may further include a hard pattern overlapping the planar area.

According to an embodiment, the hard pattern may be provided in plural including a plurality of second hard pieces (e.g., second hard sub-patterns), and the restoration layer may further include a plurality of second soft pieces (e.g., second soft sub-patterns) between the second hard pieces and overlapping the planar area.

According to an embodiment, the soft pattern may include a polymer resin.

According to an embodiment, the hard coating layer may include a silicone resin and a metal oxide.

According to an embodiment, the plastic film may include a polymer resin.

Therefore, one or more embodiment of a foldable display device may include the window protective layer on a window and protecting the window. The window protective layer may include a plastic film, a restoration layer and a hard coating layer. As the window protective layer includes the plastic film, the window may be protected. In addition, as the window protective layer includes the restoration layer, the restoration force of the plastic film may be improved against external forces such as stamping. In addition, as the window protective layer includes the hard coating layer, the wear resistance of the window protective layer may be improved.

It is to be understood that both the foregoing general description and the following detailed description are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the invention.

DETAILED DESCRIPTION

Figure 1:
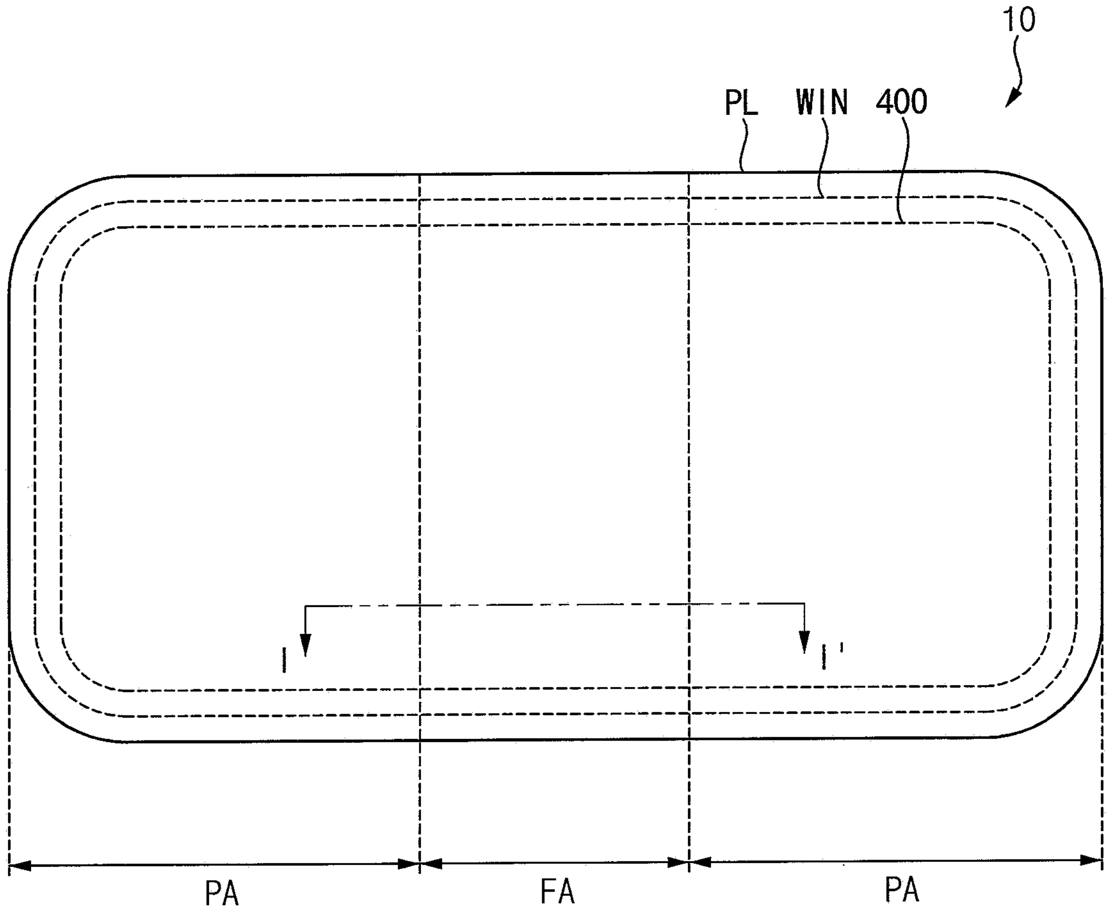
FIG. 1 is a plan view illustrating an embodiment of a foldable display device.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Illustrative, non-limiting embodiments will be more clearly understood from the following detailed description in conjunction with the accompanying drawings.

Figure 2:
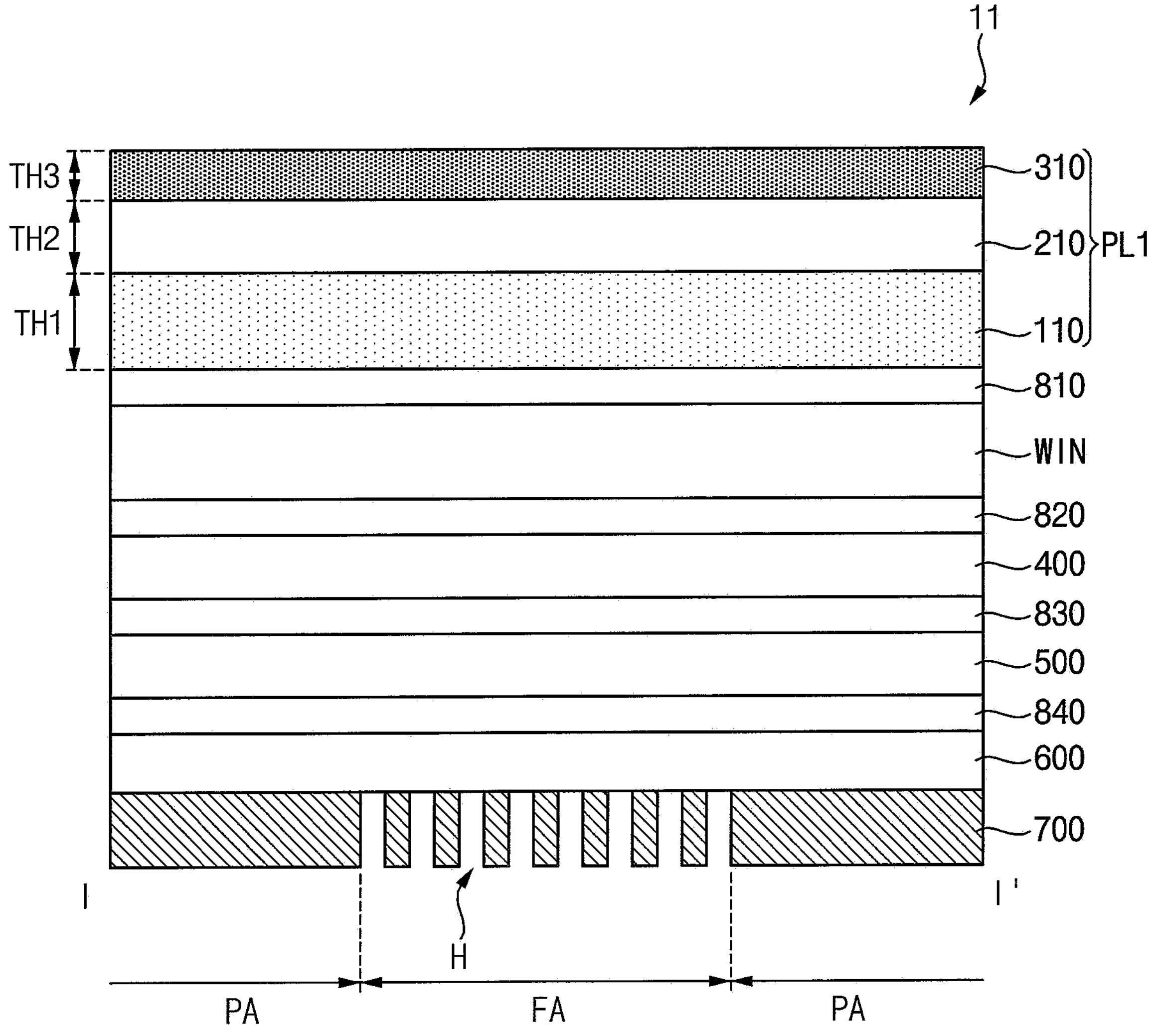
FIG. 2 is a cross-sectional view illustrating an embodiment of the foldable display device of FIG. 1.
Figure 3:
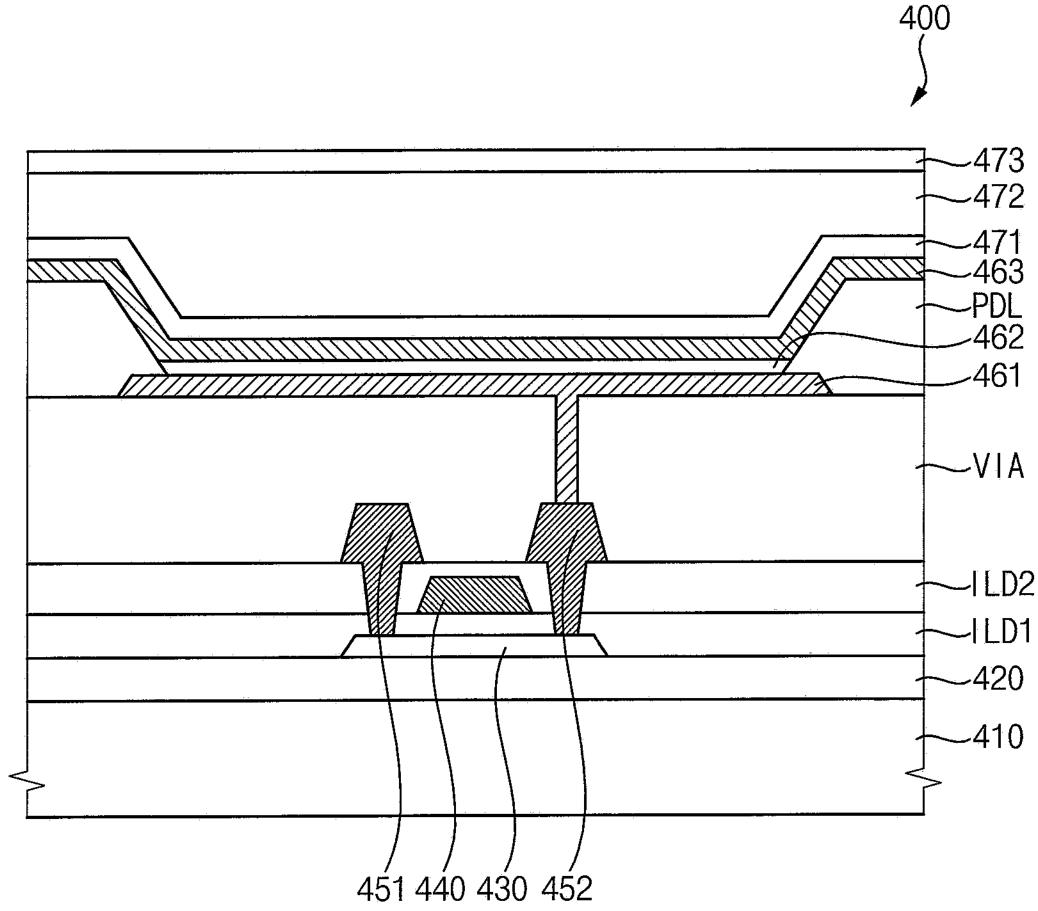
FIG. 3 is a cross-sectional view illustrating an embodiment of a display panel included in the foldable display device of FIG. 2.

FIG. 1 is a plan view illustrating an embodiment of a foldable display device 10. FIG. 2 is a cross-sectional view illustrating an embodiment of a foldable display device 11. FIG. 3 is a cross-sectional view illustrating an embodiment of a display panel 400 included in the foldable display device 11 of FIG. 2. FIG. 2 may be a cross-sectional view taken along line I-I' of FIG. 1.

Referring to FIG. 1, a foldable display device 10 includes a display panel 400, a window WIN, and a window protective layer PL. The window WIN may be disposed on the display panel 400, and the window protective layer PL may be disposed on the window WIN. That is, the display panel 400, the window WIN and the window protective layer PL may be disposed in order along a thickness direction of the foldable display device 10. The foldable display device 10 which is flat or unfolded is disposed in a plane defined by a first direction and a second direction crossing each other, such as a horizontal direction and a vertical direction of FIG.

1, without being limited thereto. The thickness direction may be defined along a third direction which crosses each of the first direction and the second direction, such as vertical in FIG. 2.

The display panel 400 may generate and/or display an image, and the window WIN may protect the display panel 400. The window WIN transmits the image to outside the foldable display device 10. The window protective layer PL may be disposed on the top of the foldable display device 10 and may protect the window WIN. The window protective layer PL transmits the image to outside the foldable display device 10. The window protective layer PL may form a front surface of the foldable display device 10, without being limited thereto. The foldable display device 10 includes the window WIN facing the display panel 400 and the window protective layer PL facing the display panel 400 with the window WIN therebetween.

In an embodiment, the display panel 400 may include a folding area FA and a planar area PA which is adjacent to the folding area FA. The display panel 400 may include the planar area PA provided in plural disposed at opposing sides of the folding area FA along a first direction, without being limited thereto. As shown in FIG. 1, the display panel 400 may include the folding area FA overlapping or corresponding to a central portion of the display panel 400 along the first direction, and the planar areas PA adjacent to left and right sides of the folding area FA along the first direction. The display panel 400 may be foldable in the folding area FA. The planar area PA may be an area at which the display panel 400 is not foldable or which remains flat even in the display panel 400 which is folded at the folding area FA (e.g., non-folding area).

Other components of the foldable display device 10 may include a folding area FA and a planar area PA corresponding to those described above for the display panel 400. Accordingly, the window WIN and the window protective layer PL may be foldable at the folding area FA. That is, the display panel 400, the window WIN and the window protective layer PL may be foldable together with each other.

Referring to FIGS. 2 and 3, a foldable display device 11 may include the display panel 400, the window WIN, a first window protective layer PL1, a protective film 500, a buffer member 600, a support member 700, a first adhesive layer 810, a second adhesive layer 820, a third adhesive layer 830 and a fourth adhesive layer 840.

As shown in FIG. 3, the display panel 400 may include a substrate 410, a buffer layer 420, an active pattern 430, a first insulating layer ILD1, a gate electrode 440, and a second insulating layer ILD2, a source electrode 451, a drain electrode 452, a via insulating layer VIA, a first electrode 461, an emission layer 462, a second electrode 463, a pixel defining layer PDL, a first inorganic layer 471, an organic layer 472 and a second inorganic layer 473.

The substrate 410 may include glass, quartz, plastic or the like. In an embodiment, for example, the substrate 410 may be a plastic substrate and may include polyimide ("PI"). In an embodiment, the substrate 410 may have a structure in which at least one polyimide layer and at least one barrier layer are alternately stacked.

The buffer layer 420 may be disposed on the substrate 410. The buffer layer 420 may include silicon oxide, silicon nitride or the like. The buffer layer 420 may reduce or effectively prevent impurities from being diffused into the active pattern 430.

The active pattern 430 may be disposed on the buffer layer 420. In an embodiment, for example, the active pattern 430 may include a silicon semiconductor, an oxide semiconductor or the like. The silicon semiconductor may include amorphous silicon or polycrystalline silicon. The active pattern 430 may pass electrical current or block an electrical current according to a gate signal provided to the gate electrode 440.

The first insulating layer ILD1 may include an insulating material and may cover the active pattern 430. In an embodiment, for example, the first insulating layer ILD1 may include silicon oxide, silicon nitride, titanium oxide, tantalum oxide or the like. The first insulating layer ILD1 may electrically insulate the active pattern 430 and the gate electrode 440 from each other.

The gate electrode 440 may include a metal, an alloy, a conductive metal oxide or the like, and may be disposed on the first insulating layer ILD1. In an embodiment, for example, the gate electrode 440 may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium (Sc), indium tin oxide ("ITO"), indium zinc oxide ("IZO") or the like.

The second insulating layer ILD2 may include an insulating material and may cover the gate electrode 440. In an embodiment, for example, the second insulating layer ILD2 may include silicon oxide, silicon nitride, titanium oxide, tantalum oxide or the like. The second insulating layer ILD2 may electrically insulate the gate electrode 440 from the source electrode 451 and electrically insulate the gate electrode 440 from the drain electrode 452.

The source electrode 451 and the drain electrode 452 may include a metal, an alloy, a conductive metal oxide or the like, and may be disposed on the second insulating layer ILD2. In an embodiment, for example, the source and drain electrodes 451 and 452 may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO") or the like.

The via insulating layer VIA may cover the source and drain electrodes 451 and 452, may include an organic insulating material, and may have a substantially flat top surface. In an embodiment, for example, the via insulating layer VIA may include a photoresist, a polyacrylic resin, a polyimide resin, an acrylic resin or the like.

The first electrode 461 may be disposed on the via insulating layer VIA. The first electrode 461 may include a metal, an alloy or a conductive metal oxide. In an embodiment, for example, the first electrode 461 may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO") or the like. The first electrode 461 may receive a first voltage from the drain electrode 452.

The pixel defining layer PDL may be disposed on the via insulating layer VIA, and an opening exposing an upper surface of the first electrode 461 may be defined or formed in the pixel defining layer PDL. In an embodiment, for example, the pixel defining layer PDL may include an organic material such as a polyimide resin (e.g., a photosensitive polyimide resin ("PSPI")), a photoresist, a polyacrylic resin or an acrylic resin, or an inorganic material such as silicon oxide and silicon nitride.

The emission layer 462 may be disposed on the first electrode 461. The emission layer 462 may have a multilayer structure including an organic emission layer, a hole injection layer, a hole transport layer, an electron transport layer and/or an electron injection layer.

The second electrode 463 may be disposed on the emission layer 462 and may receive a second voltage. The second electrode 463 may include a metal, an alloy, a conductive metal oxide or the like. In an embodiment, for example, the second electrode 463 may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO") or the like.

Due to a voltage difference between the first voltage and the second voltage, the emission layer 462 may generate and emit light. Accordingly, the first electrode 461, the emission layer 462 and the second electrode 463 may be defined as a display element such as an organic light emitting diode.

A thin film encapsulation layer may be disposed on the second electrode 463. The thin film encapsulation layer may reduce or effectively prevent penetration of moisture and oxygen from outside the display panel 400. In an embodiment, for example, the thin film encapsulation layer may have a structure in which inorganic material layers and an organic material layer are alternately stacked such as including the first inorganic layer 471, the organic layer 472 and the second inorganic layer 473 in order.

Referring back to FIG. 2, the second adhesive layer 820 may be disposed on the display panel 400. In an embodiment, for example, the second adhesive layer 820 may be an optically transparent adhesive ("OCA"), an optically transparent adhesive resin ("OCR"), a pressure sensitive adhesive ("PSA") or the like.

The window WIN may be disposed on the second adhesive layer 820. The window WIN may protect the display panel 400. In an embodiment, for example, the window WIN may include colorless polyimide, ultra-thin film tempered glass ("UTG"), polyethylene terephthalate ("PET"), polyimide ("PI"), polyethersulfone ("PS"), polyacrylate ("PAR"), polyetherimide ("PEI"), polyethylene naphthalate ("PEN"), polyphenylene sulfide ("PPS"), polycarbonate ("PC") or the like.

The first adhesive layer 810 may be disposed on the window WIN. In an embodiment, for example, the first adhesive layer 810 may be an optically transparent adhesive ("OCA"), an optically transparent adhesive resin ("OCR"), a pressure sensitive adhesive ("PSA") or the like.

The first window protective layer PL1 may be disposed on the first adhesive layer 810. In an embodiment, the first window protective layer PL1 may include a restoration layer 110, a plastic film 210 and a hard coating layer 310 in order from the window WIN. The hard coating layer 310 is furthest from the window WIN among the restoration layer 110, the plastic film 210 and the hard coating layer 310. The first window protective layer PL1 includes the plastic film 210 which faces the folding area FA and the planar area PA of the display panel 400 and the hard coating layer 310 which faces the folding area FA and the planar area PA of the display panel 400 and has a rigidity.

The restoration layer 110 may be disposed on the first adhesive layer 810 and may have a self-healing function. As a self-healing function, the restoration layer 110 may retain a shape or return to an original shape after deformation thereof (e.g., shape-restoration layer). The shape-restoration layer (e.g., the restoration layer 110) includes a soft material pattern which corresponds to the folding area FA and has a rigidity. In an embodiment, the restoration layer 110 may include a polymer resin. In an embodiment, for example, the restoration layer 110 may include polyurethane ("PU"), thermoplastic polyurethane ("TPU"), silicone (Si), polydimethyl acrylamide ("PDMA") or the like. The restoration layer 110 may include only the soft material pattern in both the folding area FA and the planar area PA, but is not limited thereto.

The plastic film 210 may be disposed on the restoration layer 110 and may protect the window WIN. In an embodiment, the plastic film 210 may include a polymer resin. In an embodiment, for example, the plastic film 210 may include colorless polyimide, polyethylene terephthalate ("PET"), polyimide ("PI"), polyethersulfone ("PS"), polyacrylate ("PAR"), polyetherimide ("PEI"), polyethylene naphthalate ("PEN"), polyphenylene sulfide ("PPS"), polycarbonate ("PC") or the like.

The hard coating layer 310 may be disposed on the plastic film 210 and may have relatively high rigidity. As having rigidity, the hard coating layer 310 may resist damage such as being an impact-resistant layer and/or a water-resistant layer. In an embodiment, for example, a water contact angle of the hard coating layer 310 may be greater than about 95 degrees.

In an embodiment, the hard coating layer 310 may include a silicone resin and a metal oxide. In detail, the metal oxide may be combined with the silicone resin. In an embodiment, for example, the silicone resin may be silsesquioxane ("SSQ") such as hydrogen silsesquioxane ("HSQ") and methylsilsesquioxane ("MSQ"). In addition, the metal oxide may include aluminum oxide ($Al_2O_3$), silicon dioxide ($SiO_2$), indium tin oxide ("ITO"), fluorine doped tin oxide ("FTO"), antimony tin oxide ("ATO"), aluminum zinc oxide ("AZO") or the like. In addition, the hard coating layer 310 may resist fingerprints, such as being an anti-fingerprint layer.

In an embodiment, within the hard coating layer 310, a content of the metal oxide relative to a total content of the hard coating layer 310 may be greater than about 0.5 weight percent (wt %) and less than about 5 wt %. As the content of the metal oxide increases, the rigidity of the hard coating layer 310 may increase. However, as the content of the metal oxide increases, a haze of the hard coating layer 310 may also increase. Accordingly, the content of the metal oxide may be set in consideration of the rigidity of the hard coating layer 310 and the haze of the hard coating layer 310.

In an embodiment, a first thickness TH1 of the restoration layer 110 may be about 40 micrometers (um), a second thickness TH2 of the plastic film 210 may be about 40 um, and a third thickness TH3 of the hard coating layer 310 may be about 5 um.

As the first window protective layer PL1 includes the plastic film 210, the window WIN may be protected. In addition, as the first window protective layer PL1 includes the restoration layer 110, the restoration force of the plastic film 210 may be improved against external forces such as stamping. In addition, as the first window protective layer PL1 includes the hard coating layer 310, the wear resistance of the first window protective layer PL1 may be improved.

The third adhesive layer 830 may be disposed under the display panel 400. In an embodiment, for example, the third adhesive layer 830 may be an optically transparent adhesive ("OCA"), an optically transparent adhesive resin ("OCR"), a pressure sensitive adhesive ("PSA") or the like.

The protective film 500 may be disposed under the third adhesive layer 830. The protective film 500 may prevent penetration of moisture and oxygen from outside the protective film 500 and absorb external shocks.

The fourth adhesive layer 840 may be disposed under the protective film 500. In an embodiment, for example, the fourth adhesive layer 840 may be an optically transparent adhesive ("OCA"), an optically transparent adhesive resin ("OCR"), a pressure sensitive adhesive ("PSA") or the like.

The buffer member 600 may be disposed under the fourth adhesive layer 840. The buffer member 600 may protect the display panel 400 by buffering an external impact. In an embodiment, for example, the buffer member 600 may include a material capable of buffering against an impact such as by containing air such as a cushion or a sponge. In addition, the buffer member 600 may include an acrylic resin, polyurethane, thermoplastic polyurethane, latex, polyurethane foam, polystyrene foam or the like.

The support member 700 may be disposed under the buffer member 600. The support member 700 may support the display panel 400. In an embodiment, for example, the support member 700 may include Invar, which is an alloy of nickel ("Ni"), iron ("Fe"), stainless steel ("SUS"), titanium ("Ti"), copper ("Cu") or the like. In addition, a hole H may be provided in plural including holes H overlapping or corresponding to the folding area FA may be defined or formed in the support member 700.

The foldable display device 11 may include the first window protective layer PL1 that protects the window WIN. The first window protective layer PL1 may include the restoration layer 110, the plastic film 210 disposed on the restoration layer 110, and the hard coating layer 310 disposed on the plastic film 210. As the first window protective layer PL1 includes the plastic film 210, the window WIN may be protected. In addition, as the first window protective layer PL1 includes the restoration layer 110, the restoration force of the plastic film 210 may be improved against external forces such as stamping. In addition, as the first window protective layer PL1 includes the hard coating layer 310, the wear resistance of the first window protective layer PL1 may be improved.

Figure 4:
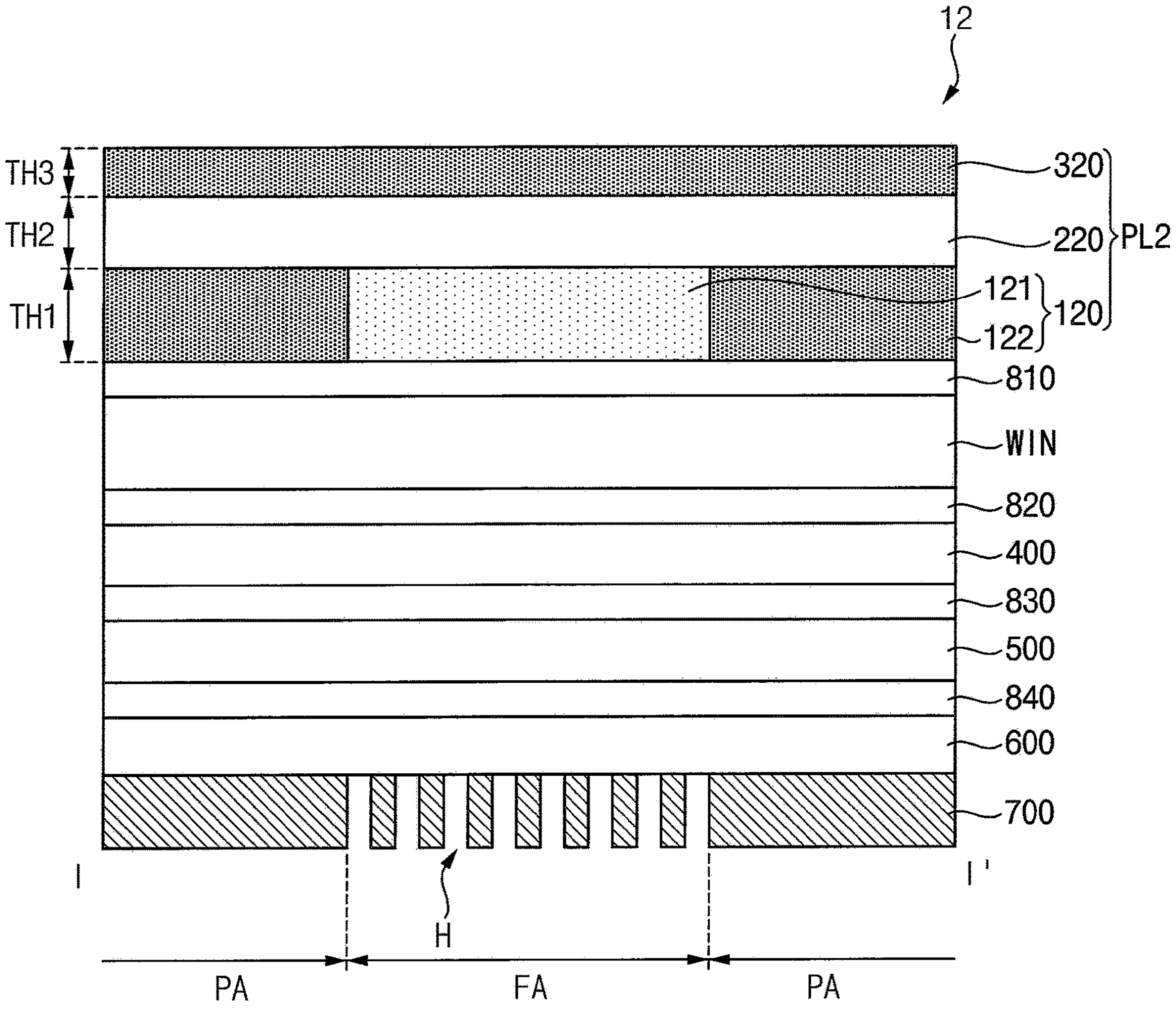
FIG. 4 is a cross-sectional view illustrating an embodiment of the foldable display device of FIG. 1.

FIG. 4 is a cross-sectional view illustrating an embodiment of a foldable display device 12. FIG. 4 may be a cross-sectional view taken along line I-I' of FIG. 1.

Referring to FIGS. 1 and 4, a foldable display device 12 may include the display panel 400, the window WIN, a second window protective layer PL2, the protective film 500, the buffer member 600, the support member 700, the first adhesive layer 810, the second adhesive layer 820, the third adhesive layer 830 and the fourth adhesive layer 840. However, the foldable display device 12 may be substantially the same as the foldable display device 11 described with reference to FIG. 2 except for the second window protective layer PL2.

The second window protective layer PL2 may be disposed on the first adhesive layer 810. In an embodiment, the second window protective layer PL2 may include a restoration layer 120, a plastic film 220 and a hard coating layer 320. The restoration layer 120 may include a soft pattern 121 and a hard pattern 122. The soft pattern 121 and the hard pattern 122 may be in a same layer of the foldable display device 12. The soft pattern 121 and the hard pattern 122 may be coplanar with each other.

The restoration layer 120 may be disposed on the first adhesive layer 810. In an embodiment, the restoration layer 120 may include the soft pattern 121 overlapping or corresponding the folding area FA and the hard pattern 122 overlapping or corresponding the planar pattern. The rigidity of the hard pattern 122 may be greater than the rigidity of the soft pattern 121. The soft pattern 121 and the hard pattern 122 may each be a solid pattern of a respective material. That is, the shape-restoration layer further includes a hard pattern 122 which corresponds to the planar area PA and has a rigidity.

The soft pattern 121 may be flexible and have a self-healing function. In an embodiment, the soft pattern 121 may include a polymer resin. In an embodiment, for example, the soft pattern 121 may include polyurethane ("PU"), thermoplastic polyurethane ("TPU"), silicone (Si), polydimethyl acrylamide ("PDMA") or the like. The hard pattern 122 may include a material having the rigidity greater than the rigidity of the soft pattern 121. In an embodiment, for example, the hard pattern 122 may include the same material as the hard coating layer 320.

As the restoration layer 120 includes the soft pattern 121 overlapping or corresponding to the folding area FA, the foldable display device 12 may be smoothly folded. In addition, as the restoration layer 120 includes the hard pattern 122 overlapping or corresponding to the planar area PA, the wear resistance of the second window protective layer PL2 may be improved.

The plastic film 220 may be disposed on the restoration layer 120 and may protect the window WIN. In an embodiment, the plastic film 220 may include a polymer resin. In an embodiment, for example, the plastic film 220 may include colorless polyimide, polyethylene terephthalate ("PET"), polyimide ("PI"), polyethersulfone ("PS"), polyacrylate ("PAR"), polyetherimide ("PEI"), polyethylene naphthalate ("PEN"), polyphenylene sulfide ("PPS"), polycarbonate ("PC") or the like.

The hard coating layer 320 may be disposed on the plastic film 220 and may have relatively high rigidity. In an embodiment, for example, the water contact angle of the hard coating layer 320 may be greater than about 95 degrees.

In an embodiment, the hard coating layer 320 may include a silicone resin and a metal oxide. In detail, the metal oxide may be combined with the silicone resin. In an embodiment, for example, the silicone resin may be silsesquioxane ("SSQ") such as hydrogen silsesquioxane ("HSQ") and methylsilsesquioxane ("MSQ"). In addition, the metal oxide may include aluminum oxide ($Al_2O_3$), silicon dioxide ($SiO_2$), indium tin oxide ("ITO"), fluorine doped tin oxide ("FTO"), antimony tin oxide ("ATO"), aluminum zinc oxide ("AZO") or the like. In addition, the hard coating layer 310 may be an anti-fingerprint layer.

In an embodiment, within the hard coating layer 320, a content of the metal oxide relative to a total content of the hard coating layer 320 may be greater than about 0.5 wt % and less than about 5 wt %. As the content of the metal oxide increases, the rigidity of the hard coating layer 320 may increase. However, as the content of the metal oxide increases, a haze of the hard coating layer 320 may also increase. Accordingly, the content of the metal oxide may be set in consideration of the rigidity of the hard coating layer 320 and the haze of the hard coating layer 320.

In an embodiment, a first thickness TH1 of the restoration layer 120 may be about 40 um, a second thickness TH2 of the plastic film 220 may be about 40 um, and a third thickness TH3 of the hard coating layer 320 may be about 5 um.

The foldable display device 12 may include the second window protective layer PL2 that protects the window WIN. The second window protective layer PL2 may include the restoration layer 120, the plastic film 220 disposed on the restoration layer 120, and the hard coating layer 320 disposed on the plastic film 220. As the second window protective layer PL2 includes the plastic film 220, the window WIN may be protected. In addition, as the second window protective layer PL2 includes the restoration layer 120, the restoration force of the plastic film 220 may be improved against external forces such as stamping. In addition, as the second window protective layer PL2 includes the hard coating layer 320, the wear resistance of the second window protective layer PL2 may be improved. In addition, as the restoration layer 120 includes the soft pattern 121 overlapping or corresponding to the folding area FA, the foldable display device 12 may be smoothly folded. In addition, as the restoration layer 120 includes the hard pattern 122 overlapping or corresponding to the planar area PA, the wear resistance of the second window protective layer PL2 may be improved.

Figure 5:
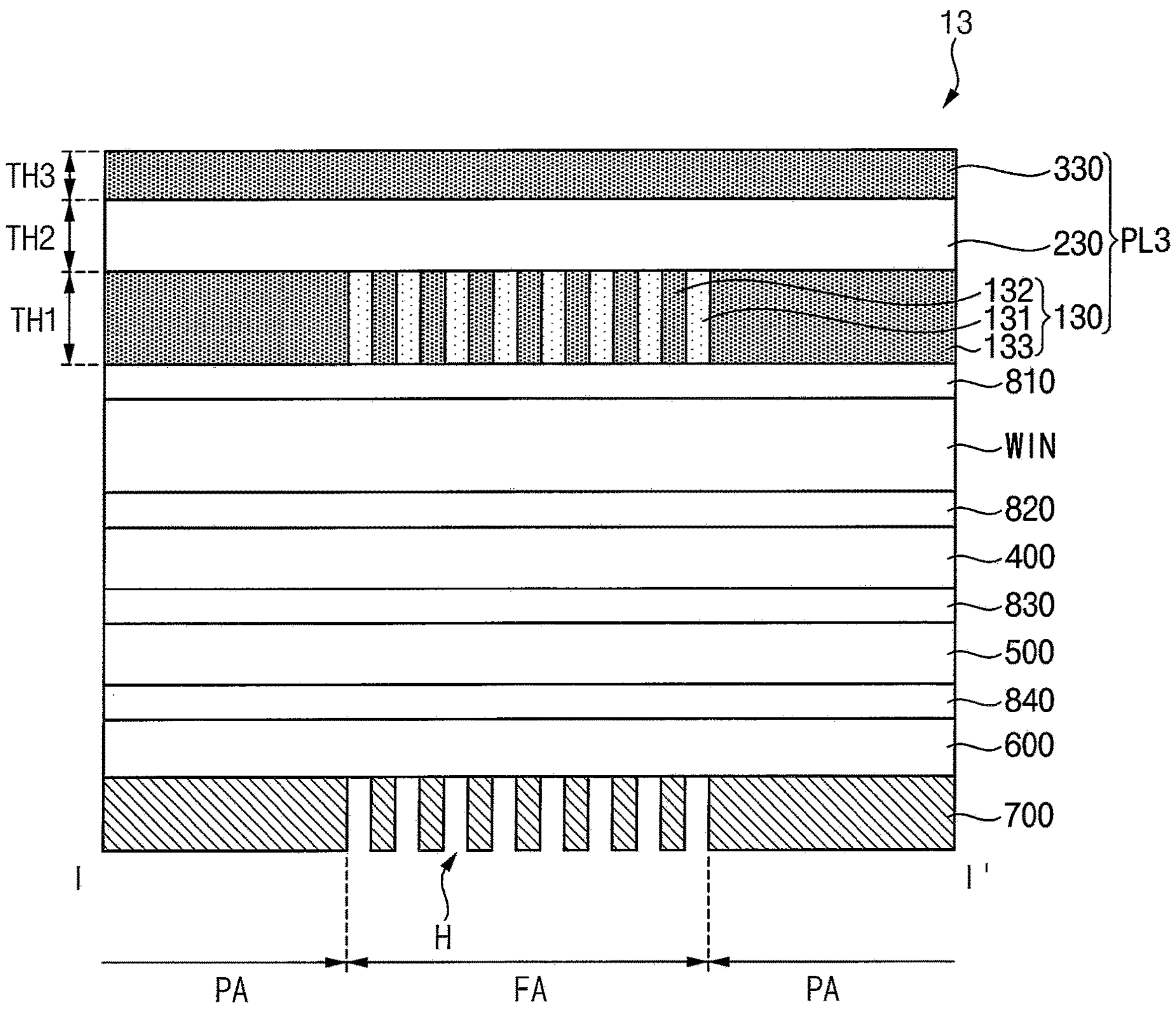
FIG. 5 is a cross-sectional view illustrating an embodiment of the foldable display device of FIG. 1.

FIG. 5 is a cross-sectional view illustrating an embodiment of a foldable display device 13. FIG. 5 may be a cross-sectional view taken along line I-I' of FIG. 1.

Referring to FIGS. 1 and 5, a foldable display device 13 may include the display panel 400, the window WIN, a third window protective layer PL3, the protective film 500, the buffer member 600, the support member 700, the first adhesive layer 810, the second adhesive layer 820, the third adhesive layer 830 and the fourth adhesive layer 840. However, the foldable display device 13 may be substantially the same as the foldable display device 11 described with reference to FIG. 2 except for the third window protective layer PL3.

The third window protective layer PL3 may be disposed on the first adhesive layer 810. In an embodiment, the third window protective layer PL3 may include a restoration layer 130, a plastic film 230 and a hard coating layer 330. The restoration layer 130 may include a soft sub-pattern 131 provided in plural including a plurality of soft sub-patterns 131 (e.g., soft pieces), a hard sub-pattern 132 provided in plural including a plurality of hard sub-patterns 132 (e.g., hard pieces), and a hard pattern 133. Each of the soft sub-patterns 131, the hard sub-patterns 132 and the hard pattern 133 may a solid pattern of a respective material. In an embodiment, the shape-restoration layer includes a plurality of hard sub-patterns 132 which are arranged along the folding area FA to alternate with the soft sub-patterns 131 and have a rigidity.

The restoration layer 130 may be disposed on the first adhesive layer 810. In an embodiment, the restoration layer 130 may include the soft sub-patterns 131 overlapping or corresponding to the folding area FA, the hard sub-patterns 132 overlapping or corresponding to the folding area FA, and the hard pattern 133 overlapping or corresponding to the planar area PA. Within the folding area FA, the soft sub-patterns 131 alternate with the hard sub-patterns 132. In a direction along the window WIN, patterns including hard material are alternately arranged with patterns including soft material having rigidity lower than the hard material. The rigidity of the hard sub-patterns 132 and the hard pattern 133 may be greater than the rigidity of the soft sub-patterns 131. In addition, the rigidity of the hard sub-patterns 132 may be substantially the same as the rigidity of the hard pattern 133.

The soft sub-patterns 131 may have a self-healing function. In an embodiment, the soft sub-patterns 131 may include a polymer resin. In an embodiment, for example, the soft sub-patterns 131 may include polyurethane ("PU)", thermoplastic polyurethane ("TPU"), silicone (Si), polydimethyl acrylamide ("PDMA") or the like. The hard sub-patterns 132 and the hard pattern 133 may include a material having the rigidity greater than the rigidity of the soft sub-patterns 131. In an embodiment, for example, the hard sub-patterns 132 and the hard pattern 133 may include the same material as the hard coating layer 330.

As the restoration layer 130 includes the soft sub-patterns 131 overlapping or corresponding to the folding area FA, the foldable display device 13 may be smoothly folded. In addition, as the restoration layer 130 includes the hard sub-patterns 132 and the hard pattern 133 overlapping or corresponding to the folding area FA and the planar area PA, respectively, the wear resistance of the third window protective layer PL3 may be improved.

The plastic film 230 may be disposed on the restoration layer 130 and may protect the window WIN. In an embodiment, the plastic film 230 may include a polymer resin. In an embodiment, for example, the plastic film 230 may include colorless polyimide, polyethylene terephthalate ("PET"), polyimide ("PI"), polyethersulfone ("PS"), polyacrylate ("PAR"), polyetherimide ("PEI"), polyethylene naphthalate ("PEN"), polyphenylene sulfide ("PPS"), polycarbonate ("PC") or the like.

The hard coating layer 330 may be disposed on the plastic film 230 and may have relatively high rigidity. In an embodiment, for example, the water contact angle of the hard coating layer 330 may be greater than about 95 degrees.

In an embodiment, the hard coating layer 330 may include a silicone resin and a metal oxide. In detail, the metal oxide may be combined with the silicone resin. In an embodiment, for example, the silicone resin may be silsesquioxane ("SSQ") such as hydrogen silsesquioxane ("HSQ") and methylsilsesquioxane ("MSQ"). In addition, the metal oxide may include aluminum oxide ($Al_2O_3$), silicon dioxide ($SiO_2$), indium tin oxide ("ITO"), fluorine doped tin oxide ("FTO"), antimony tin oxide ("ATO"), aluminum zinc oxide ("AZO") or the like. In addition, the hard coating layer 320 may be an anti-fingerprint layer.

In an embodiment, within the hard coating layer 330, a content of the metal oxide relative to a total content of the hard coating layer 330 may be greater than about 0.5 wt % and less than about 5 wt %. As the content of the metal oxide increases, the rigidity of the hard coating layer 330 may increase. However, as the content of the metal oxide increases, a haze of the hard coating layer 330 may also increase. Accordingly, the content of the metal oxide may be set in consideration of the rigidity of the hard coating layer 330 and the haze of the hard coating layer 330.

In an embodiment, the first thickness TH1 of the restoration layer 130 may be about 40 um, the second thickness TH2 of the plastic film 230 may be about 40 um, and the third thickness TH3 of the hard coating layer 330 may be about 5 um.

The foldable display device 13 may include the third window protective layer PL3 that protects the window WIN. The third window protective layer PL3 may include the restoration layer 130, the plastic film 230 disposed on the restoration layer 130, and the hard coating layer 330 disposed on the plastic film 230. As the third window protective layer PL3 includes the plastic film 230, the window WIN may be protected. In addition, as the third window protective layer PL3 includes the restoration layer 130, the restoration force of the plastic film 230 may be improved against external forces such as stamping. In addition, as the third window protective layer PL3 includes the hard coating layer 330, the wear resistance of the third window protective layer PL3 may be improved. In addition, as the restoration layer 130 includes the soft sub-patterns 131 overlapping or corresponding to the folding area FA, the foldable display device 13 may be smoothly folded. In addition, as the restoration layer 130 includes the hard sub-patterns 132 and the hard pattern 133 overlapping or corresponding to the folding area FA and the planar area PA, respectively, the wear resistance of the third window protective layer PL3 may be improved.

Figure 6:
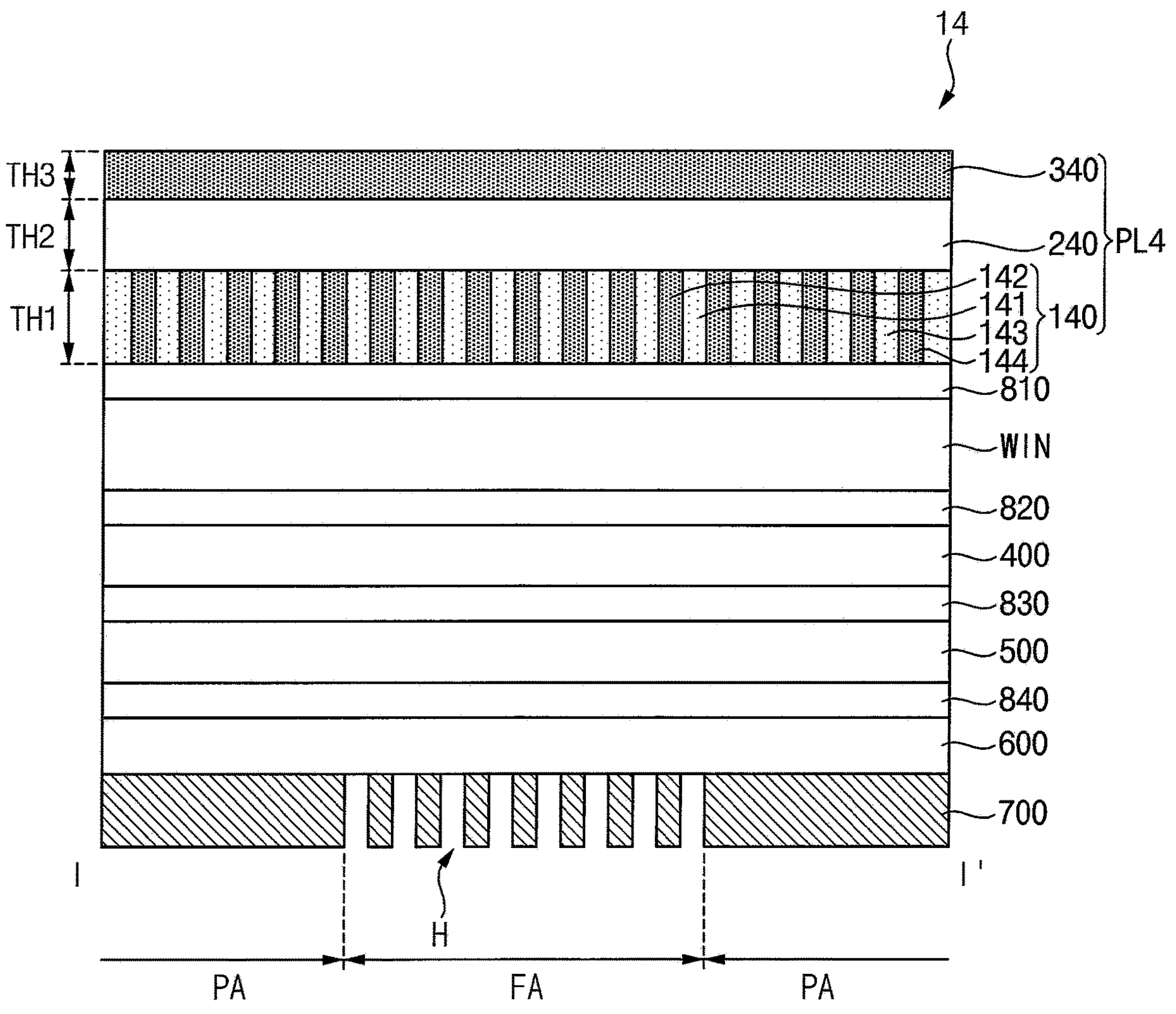
FIG. 6 is a cross-sectional view illustrating an embodiment of the foldable display device of FIG. 1.

FIG. 6 is a cross-sectional view illustrating an embodiment of a foldable display device 14. FIG. 6 may be a cross-sectional view taken along line I-I' of FIG. 1.

Referring to FIGS. 1 and 6, a foldable display device 14 may include the display panel 400, the window WIN, a fourth window protective layer PL4, the protective film 500, the buffer member 600, the support member 700, the first adhesive layer 810, the second adhesive layer 820, the third adhesive layer 830, and the fourth adhesive layer 840. However, the foldable display device 14 may be substantially the same as the foldable display device 11 described with reference to FIG. 2 except for the fourth window protective layer PL4.

The fourth window protective layer PL4 may be disposed on the first adhesive layer 810. In an embodiment, the fourth window protective layer PL4 may include a restoration layer 140, a plastic film 240 and a hard coating layer 340. The restoration layer 140 may include a plurality of first soft sub-patterns 141, a plurality of first hard sub-patterns 142, a plurality of second soft sub-patterns 143 and a plurality of second hard sub-patterns 144.

The restoration layer 140 may be disposed on the first adhesive layer 810. In an embodiment, the restoration layer 140 may include the first soft sub-patterns 141 overlapping or corresponding to the folding area FA, the first hard sub-patterns 142 overlapping or corresponding to the folding area FA, the second soft sub-patterns 143 overlapping or corresponding to the planar area PA, and the second hard sub-patterns 144 overlapping or corresponding to the planar area PA. The rigidities of the first and second hard sub-patterns 142 and 144 may be greater than the rigidities of the first and second soft sub-patterns 141 and 143. In addition, the rigidity of the first hard sub-patterns 142 may be substantially the same as the rigidity of the second hard sub-patterns 144. Within the folding area FA, the first soft sub-patterns 141 alternate with the first hard sub-patterns 142. Within the planar area PA, the second soft sub-patterns 143 alternate with the second hard sub-patterns 144.

The first and second soft sub-patterns 141 and 143 may have a self-healing function. In an embodiment, the first and second soft sub-patterns 141 and 143 may include a polymer resin. In an embodiment, for example, the first and second soft sub-patterns 141 and 143 may include polyurethane ("PU"), thermoplastic polyurethane ("TPU"), silicone (Si), polydimethyl acrylamide ("PDMA") or the like. The first and second hard sub-patterns 142 and 144 may include a material having the rigidity greater than the rigidities of the first and second soft sub-patterns 141 and 143. In an embodiment, for example, the first and second hard sub-patterns 142 and 144 may include the same material as the hard coating layer 340.

As the restoration layer 140 includes the first and second soft sub-patterns 141 and 143, the foldable display device 14 may be smoothly folded. In addition, as the restoration layer 140 includes the first and second hard sub-patterns 142 and 144, the wear resistance of the fourth window protective layer PL4 may be improved.

The plastic film 240 may be disposed on the restoration layer 140 and may protect the window WIN. In an embodiment, the plastic film 240 may include a polymer resin. In an embodiment, for example, the plastic film 240 may include colorless polyimide, polyethylene terephthalate ("PET"), polyimide ("PI"), polyethersulfone ("PS"), polyacrylate ("PAR"), polyetherimide ("PEI"), polyethylene naphthalate ("PEN"), polyphenylene sulfide ("PPS"), polycarbonate ("PC") or the like.

The hard coating layer 340 may be disposed on the plastic film 240 and may have relatively high rigidity. In an embodiment, for example, the water contact angle of the hard coating layer 340 may be greater than about 95 degrees.

In an embodiment, the hard coating layer 340 may include a silicone resin and a metal oxide. In detail, the metal oxide may be combined with the silicone resin. In an embodiment, for example, the silicone resin may be silsesquioxane ("SSQ") such as hydrogen silsesquioxane ("HSQ") and methylsilsesquioxane ("MSQ"). In addition, the metal oxide may include aluminum oxide ($Al_2O_3$), silicon dioxide ($SiO_2$), indium tin oxide ("ITO"), fluorine doped tin oxide ("FTO"), antimony tin oxide ("ATO"), aluminum zinc oxide ("AZO") or the like. In addition, the hard coating layer 340 may be an anti-fingerprint layer.

In an embodiment, within the hard coating layer 340, a content of the metal oxide relative to a total content of the hard coating layer 340 may be greater than about 0.5 wt % and less than about 5 wt %. As the content of the metal oxide increases, the rigidity of the hard coating layer 340 may increase. However, as the content of the metal oxide increases, a haze of the hard coating layer 340 may also increase. Accordingly, the content of the metal oxide may be set in consideration of the rigidity of the hard coating layer 340 and the haze of the hard coating layer 340.

In an embodiment, the first thickness TH1 of the restoration layer 140 may be about 40 um, the second thickness TH2 of the plastic film 240 is about 40 um, and the third thickness TH3 of the hard coating layer 340 may be about 5 um.

The foldable display device 14 may include the fourth window protective layer PL4 to protect the window WIN. The fourth window protective layer PL4 may include the restoration layer 140, the plastic film 240 disposed on the restoration layer 140, and the hard coating layer 340 disposed on the plastic film 240. As the fourth window protective layer PL4 includes the plastic film 240, the window WIN may be protected. In addition, as the fourth window protective layer PL4 includes the restoration layer 140, the restoration force of the plastic film 240 may be improved against external forces such as stamping. In addition, as the fourth window protective layer PL4 includes the hard coating layer 340, the wear resistance of the fourth window protective layer PL4 may be improved. In addition, as the restoration layer 140 includes the first and second soft sub-patterns 141 and 143, the foldable display device 14 may be smoothly folded. In addition, as the restoration layer 140 includes the first and second hard sub-patterns 142 and 144, the wear resistance of the fourth window protective layer PL4 may be improved.

Figure 7:
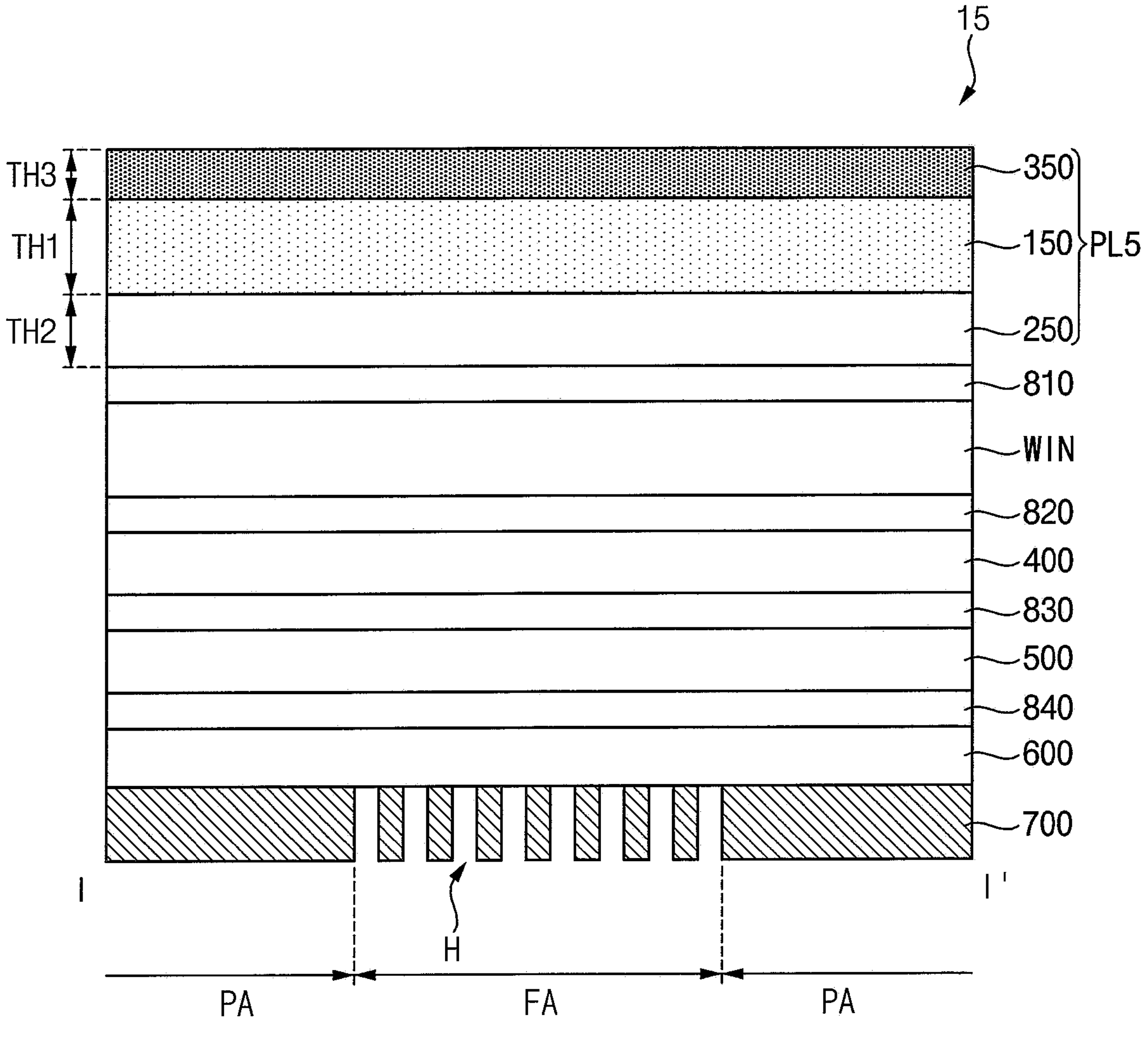
FIG. 7 is a cross-sectional view illustrating an embodiment of the foldable display device of FIG. 1.

FIG. 7 is a cross-sectional view illustrating an embodiment of a foldable display device 15. FIG. 7 may be a cross-sectional view taken along line I-I' of FIG. 1.

Referring to FIGS. 1 and 7, a foldable display device 15 may include the display panel 400, the window WIN, a fifth window protective layer PL5, the protective film 500, the buffer member 600, the support member 700, the first adhesive layer 810, the second adhesive layer 820, the third adhesive layer 830, and the fourth adhesive layer 840. However, the foldable display device 15 may be substantially the same as the foldable display device 11 described with reference to FIG. 2 except for the fifth window protective layer PL5.

The fifth window protective layer PL5 may be disposed on the first adhesive layer 810. In an embodiment, the fifth window protective layer PL5 may include a plastic film 250, a restoration layer 150 and a hard coating layer 350. The plastic film 250, the restoration layer 150 and the hard coating layer 350 is in order from the window WIN. The hard coating layer 350 is furthest from the window WIN among the plastic film 250, the restoration layer 150 and the hard coating layer 350.

The plastic film 250 may be disposed on the first adhesive layer 810 and may protect the window WIN. In an embodiment, the plastic film 250 may include a polymer resin. In an embodiment, for example, the plastic film 250 may include colorless polyimide, polyethylene terephthalate ("PET"), polyimide ("PI"), polyethersulfone ("PS"), polyacrylate ("PAR"), polyetherimide ("PEI"), polyethylene naphthalate ("PEN"), polyphenylene sulfide ("PPS"), polycarbonate ("PC") or the like.

The restoration layer 150 may be disposed on the plastic film 250 and may have a self-healing function. In an embodiment, the restoration layer 150 may include a polymer resin. In an embodiment, for example, the restoration layer 150 may include polyurethane ("PU"), thermoplastic polyurethane ("TPU"), silicone (Si), polydimethyl acrylamide ("PDMA") or the like.

The hard coating layer 350 may be disposed on the restoration layer 150 and may have relatively high rigidity. In an embodiment, for example, the water contact angle of the hard coating layer 350 may be greater than about 95 degrees.

In an embodiment, the hard coating layer 350 may include a silicone resin and a metal oxide. In detail, the metal oxide may be combined with the silicone resin. In an embodiment, for example, the silicone resin may be silsesquioxane ("SSQ") such as hydrogen silsesquioxane ("HSQ") and methylsilsesquioxane ("MSQ"). In addition, the metal oxide may include aluminum oxide ($Al_2O_3$), silicon dioxide ($SiO_2$), indium tin oxide ("ITO"), fluorine doped tin oxide ("FTO"), antimony tin oxide ("ATO"), aluminum zinc oxide ("AZO") or the like. In addition, the hard coating layer 350 may be an anti-fingerprint layer.

In an embodiment, within the hard coating layer 350, a content of the metal oxide relative to a total content of the hard coating layer 350 may be greater than about 0.5 wt % and less than about 5 wt %. As the content of the metal oxide increases, the rigidity of the hard coating layer 350 may increase. However, as the content of the metal oxide increases, a haze of the hard coating layer 350 may also increase. Accordingly, the content of the metal oxide may be set in consideration of the rigidity of the hard coating layer 350 and the haze of the hard coating layer 350.

In an embodiment, the first thickness TH1 of the restoration layer 150 may be about 40 um, the second thickness TH2 of the plastic film 250 may be about 40 um, and the third thickness TH3 of the hard coating layer 350 may be about 5 um.

As the fifth window protective layer PL5 includes the plastic film 250, the window WIN may be protected. In addition, as the fifth window protective layer PL5 includes the restoration layer 150, the restoration force of the plastic film 250 may be improved against external forces such as stamping. In addition, as the fifth window protective layer PL5 includes the hard coating layer 350, the wear resistance of the fifth window protective layer PL5 may be improved.

Figure 8:
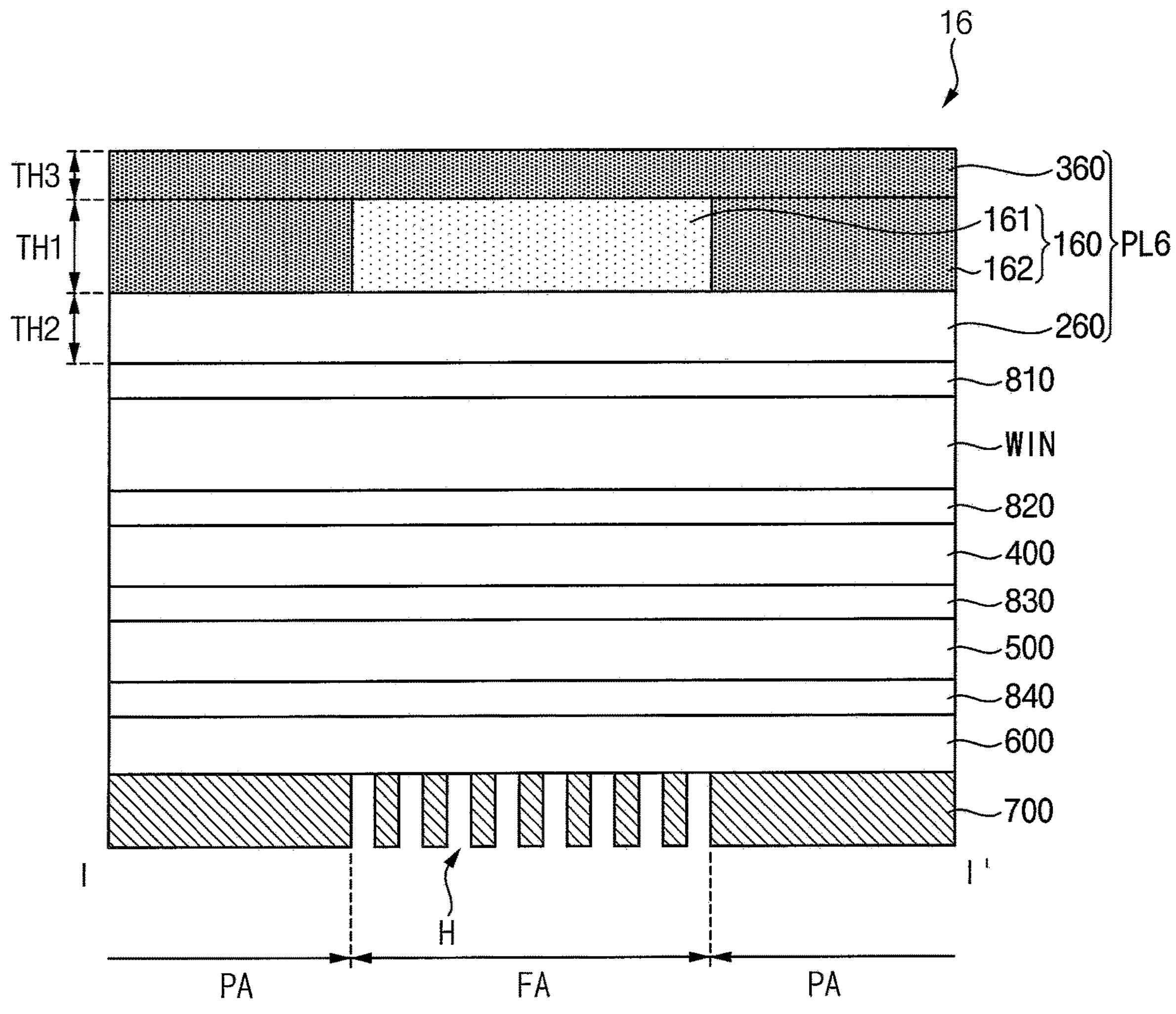
FIG. 8 is a cross-sectional view illustrating an embodiment of the foldable display device of FIG. 1.

FIG. 8 is a cross-sectional view illustrating an embodiment of a foldable display device 16. FIG. 8 may be a cross-sectional view along line I-I' of FIG. 1.

Referring to FIGS. 1 and 8, a foldable display device 16 may include the display panel 400, the window WIN, a sixth window protective layer PL6, the protective film 500, the buffer member 600, the support member 700, the first adhesive layer 810, the second adhesive layer 820, the third adhesive layer 830, and the fourth adhesive layer 840. However, the foldable display device 16 may be substantially the same as the foldable display device 11 described with reference to FIG. 2 except for the sixth window protective layer PL6.

The sixth window protective layer PL6 may be disposed on the first adhesive layer 810. In an embodiment, the sixth window protective layer PL6 may include a plastic film 260, a restoration layer 160 and a hard coating layer 360. The restoration layer 160 may include a soft pattern 161 and a hard pattern 162.

The plastic film 260 may be disposed on the first adhesive layer 810 and may protect the window WIN. In an embodiment, the plastic film 260 may include a polymer resin. In an embodiment, for example, the plastic film 260 may include colorless polyimide, polyethylene terephthalate ("PET"), polyimide ("PI"), polyether sulfone ("PS"), polyacrylate ("PAR"), polyetherimide ("PEI"), polyethylene naphthalate ("PEN"), polyphenylene sulfide ("PPS"), polycarbonate ("PC") or the like.

The restoration layer 160 may be disposed on the plastic film 260. In an embodiment, the restoration layer 160 may include the soft pattern 161 overlapping or corresponding to the folding area FA and the hard pattern 162 overlapping or corresponding to the planar area PA. The rigidity of the hard pattern 162 may be greater than the rigidity of the soft pattern 161.

The soft pattern 161 may have a self-healing function. In an embodiment, the soft pattern 161 may include a polymer resin. In an embodiment, for example, the soft pattern 161 may include polyurethane ("PU"), thermoplastic polyurethane ("TPU"), silicone (Si), polydimethyl acrylamide ("PDMA") or the like. The hard pattern 162 may include a material having the rigidity greater than the rigidity of the soft pattern 161. In an embodiment, for example, the hard pattern 162 may include the same material as the hard coating layer 360.

As the restoration layer 160 includes the soft pattern 161 overlapping or corresponding to the folding area FA, the foldable display device 16 may be smoothly folded. In addition, as the restoration layer 160 includes the hard pattern 162 overlapping or corresponding to the planar area PA, the wear resistance of the sixth window protective layer PL6 may be improved.

The hard coating layer 360 may be disposed on the restoration layer 160 and may have relatively high rigidity. In an embodiment, for example, the water contact angle of the hard coating layer 360 may be greater than about 95 degrees.

In an embodiment, the hard coating layer 360 may include a silicone resin and a metal oxide. In detail, the metal oxide may be combined with the silicone resin. In an embodiment, for example, the silicone resin may be silsesquioxane ("SSQ") such as hydrogen silsesquioxane ("HSQ") and methylsilsesquioxane ("MSQ"). In addition, the metal oxide may include aluminum oxide ($Al_2O_3$), silicon dioxide ($SiO_2$), indium tin oxide ("ITO"), fluorine doped tin oxide ("FTO"), antimony tin oxide ("ATO"), aluminum zinc oxide ("AZO") or the like. In addition, the hard coating layer 360 may be an anti-fingerprint layer.

In an embodiment, within the hard coating layer 360, a content of the metal oxide relative to a total content of the hard coating layer 360 may be greater than about 0.5 wt % and less than about 5 wt %. As the content of the metal oxide increases, the rigidity of the hard coating layer 360 may increase. However, as the content of the metal oxide increases, a haze of the hard coating layer 360 may increase. Accordingly, the content of the metal oxide may be set in consideration of the rigidity of the hard coating layer 360 and the haze of the hard coating layer 360.

In an embodiment, the first thickness TH1 of the restoration layer 160 may be about 40 um, the second thickness TH2 of the plastic film 260 may be about 40 um, and the third thickness TH3 of the hard coating layer 360 may be about 5 um.

The foldable display device 16 may include the sixth window protective layer PL6 that protects the window WIN. The sixth window protective layer PL6 may include the plastic film 260, the restoration layer 160 disposed on the plastic film 260, and the hard coating layer 360 disposed on the restoration layer 160. As the sixth window protective layer PL6 includes the plastic film 260, the window WIN may be protected. In addition, as the sixth window protective layer PL6 includes the restoration layer 160, the restoration force of the plastic film 260 may be improved against external forces such as stamping. In addition, as the sixth window protective layer PL6 includes the hard coating layer 360, the wear resistance of the sixth window protective layer PL6 may be improved. In addition, as the restoration layer 160 includes the soft pattern 161 overlapping or corresponding to the folding area FA, the foldable display device 16 may be smoothly folded. In addition, as the restoration layer 160 includes the hard pattern 162 overlapping or corresponding to the planar area PA, the wear resistance of the sixth window protective layer PL6 may be improved.

Figure 9:
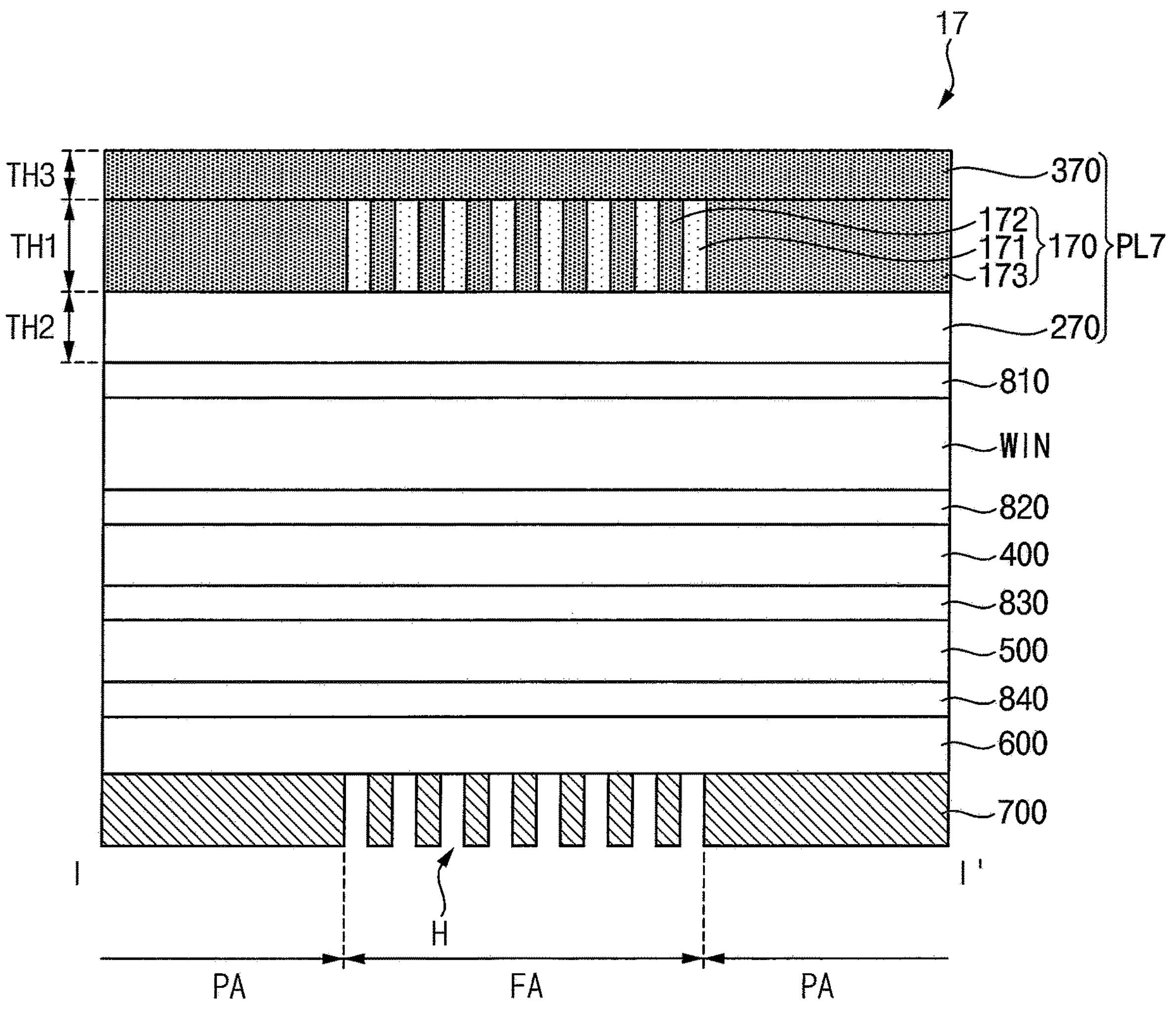
FIG. 9 is a cross-sectional view illustrating an embodiment of the foldable display device of FIG. 1.

FIG. 9 is a cross-sectional view illustrating an embodiment of a foldable display device 17. FIG. 9 may be a cross-sectional view taken along line I-I' of FIG. 1.

Referring to FIGS. 1 and 9, a foldable display device 17 may include the display panel 400, the window WIN, a seventh window protective layer PL7, the protective film 500, the buffer member 600, the support member 700, the first adhesive layer 810, the second adhesive layer 820, the third adhesive layer 830, and the fourth adhesive layer 840. However, the foldable display device 17 may be substantially the same as the foldable display device 11 described with reference to FIG. 2 except for the seventh window protective layer PL7.

The seventh window protective layer PL7 may be disposed on the first adhesive layer 810. In an embodiment, the seventh window protective layer PL7 may include a plastic film 270, a restoration layer 170, and a hard coating layer 370. The restoration layer 170 may include a plurality of soft sub-patterns 171, a plurality of hard sub-patterns 172, and a hard pattern 173.

The plastic film 270 may be disposed on the first adhesive layer 810 and may protect the window WIN. In an embodiment, the plastic film 270 may include a polymer resin. In an embodiment, for example, the plastic film 270 may include colorless polyimide, polyethylene terephthalate ("PET"), polyimide ("PI"), polyether sulfone ("PS"), polyacrylate ("PAR"), polyetherimide ("PEI"), polyethylene naphthalate ("PEN"), polyphenylene sulfide ("PPS"), polycarbonate ("PC") or the like.

The restoration layer 170 may be disposed on the plastic film 270. In an embodiment, the restoration layer 170 may include the soft sub-patterns 171 overlapping or corresponding to the folding area FA, the hard sub-patterns 172 overlapping or corresponding to the folding area FA, and the hard pattern 173 overlapping or corresponding to the planar area PA. The rigidity of the hard sub-patterns 172 and the hard pattern 173 may be greater than the rigidity of the soft sub-patterns 171. In addition, the rigidity of the hard sub-patterns 172 may be substantially the same as the rigidity of the hard pattern 173.

The soft sub-patterns 171 may have a self-healing function. In an embodiment, the soft sub-patterns 171 may include a polymer resin. In an embodiment, for example, the soft sub-patterns 171 may include polyurethane ("PU"), thermoplastic polyurethane ("TPU"), silicone (Si), polydimethyl acrylamide ("PDMA") or the like. The hard sub-patterns 172 and the hard pattern 173 may include a material having the rigidity greater than that of the soft sub-patterns 171. In an embodiment, for example, the hard sub-patterns 172 and the hard pattern 173 may include the same material as the hard coating layer 370.

As the restoration layer 170 includes the soft sub-patterns 171 overlapping or corresponding to the folding area FA, the foldable display device 17 may be smoothly folded. In addition, as the restoration layer 170 includes the hard sub-patterns 172 and the hard pattern 173 overlapping or corresponding to the planar area PA, the wear resistance of the seventh window protective layer PL7 is improved.

The hard coating layer 370 may be disposed on the restoration layer 170 and may have relatively high rigidity. In an embodiment, for example, the water contact angle of the hard coating layer 370 may be greater than about 95 degrees.

In an embodiment, the hard coating layer 370 may include a silicone resin and a metal oxide. In detail, the metal oxide may be combined with the silicone resin. In an embodiment, for example, the silicone resin may be silsesquioxane ("SSQ") such as hydrogen silsesquioxane ("HSQ") and methylsilsesquioxane ("MSQ"). In addition, the metal oxide may include aluminum oxide ($Al_2O_3$), silicon dioxide ($SiO_2$), indium tin oxide ("ITO"), fluorine doped tin oxide ("FTO"), antimony tin oxide ("ATO"), aluminum zinc oxide ("AZO") or the like. In addition, the hard coating layer 370 may be an anti-fingerprint layer.

In an embodiment, within the hard coating layer 370, a content of the metal oxide relative to a total content of the hard coating layer 370 may be greater than about 0.5 wt % and less than about 5 wt %. As the content of the metal oxide increases, the rigidity of the hard coating layer 370 may increase. However, as the content of the metal oxide increases, a haze of the hard coating layer 370 may also increase. Accordingly, the content of the metal oxide may be set in consideration of the rigidity of the hard coating layer 370 and the haze of the hard coating layer 370.

In an embodiment, the first thickness TH1 of the restoration layer 170 may be about 40 um, the second thickness TH2 of the plastic film 270 may be about 40 um, and the third thickness TH3 of the hard coating layer 370 may be about 5 um.

The foldable display device 17 may include the seventh window protective layer PL7 that protects the window WIN. The seventh window protective layer PL7 may include the plastic film 270, the restoration layer 170 disposed on the plastic film 270, and the hard coating layer 370 disposed on the restoration layer 170. As the seventh window protective layer PL7 includes the plastic film 270, the window WIN may be protected. In addition, as the seventh window protective layer PL7 includes the restoration layer 170, the restoration force of the plastic film 270 may be improved against external forces such as stamping. In addition, as the seventh window protective layer PL7 includes the hard coating layer 370, the wear resistance of the seventh window protective layer PL7 may be improved. In addition, as the restoration layer 170 includes the soft sub-patterns 171 overlapping or corresponding to the folding area FA, the foldable display device 17 may be smoothly folded. In addition, as the restoration layer 170 includes the hard sub-patterns 172 overlapping or corresponding to the folding area FA and the hard pattern 173 overlapping or corresponding to the planar area PA, the wear resistance of the seventh window protective layer PL7 may be improved.

Figure 10:
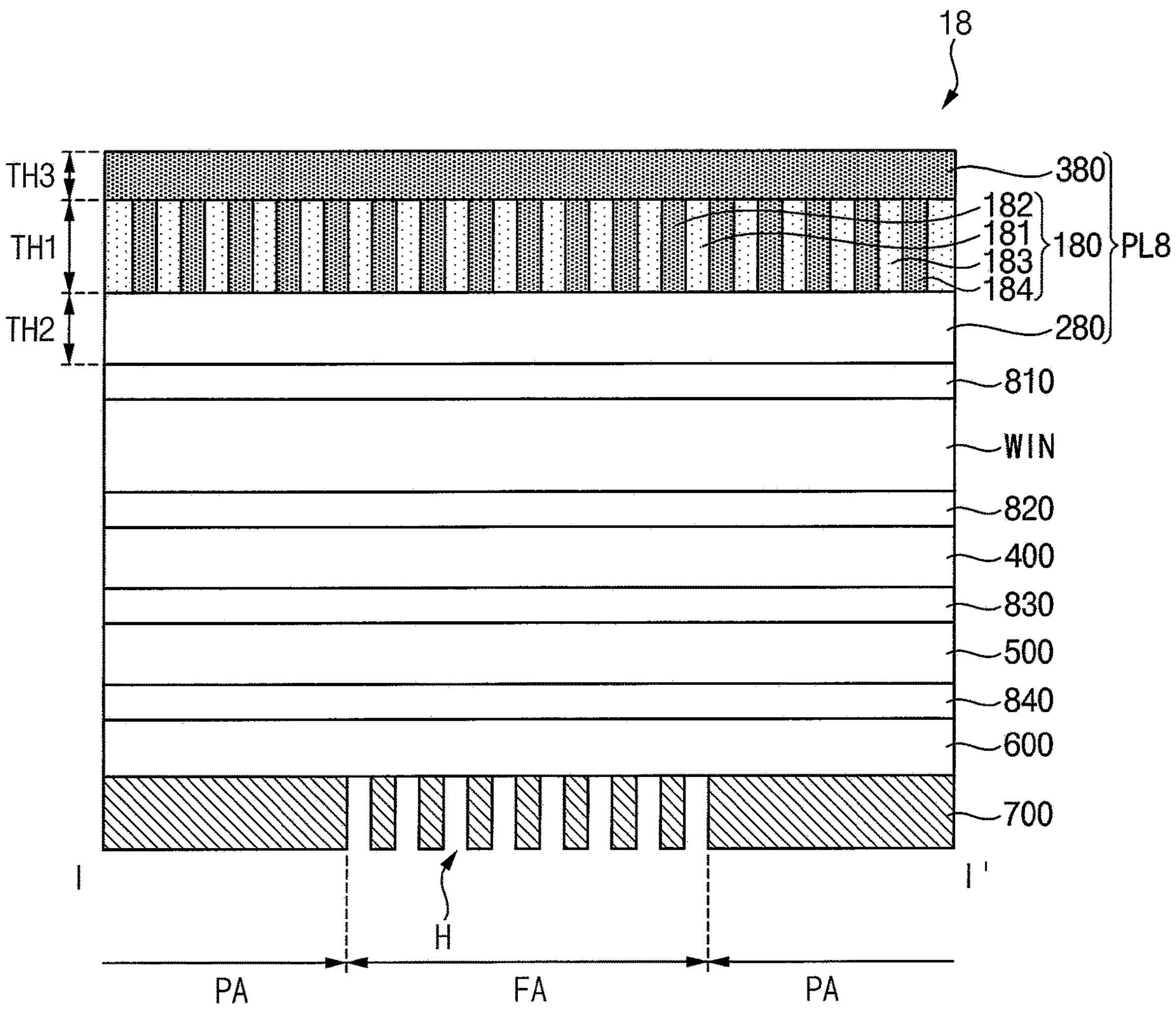
FIG. 10 is a cross-sectional view illustrating an embodiment of the foldable display device of FIG. 1.

FIG. 10 is a cross-sectional view illustrating an embodiment of a foldable display device 18. FIG. 10 may be a cross-sectional view taken along line I-I' of FIG. 1.

Referring to FIGS. 1 and 10, a foldable display device 18 may include the display panel 400, the window WIN, an eighth window protective layer PL8, the protective film 500, the buffer member 600, the support member 700, the first adhesive layer 810, the second adhesive layer 820, the third adhesive layer 830, and the fourth adhesive layer 840. However, the foldable display device 18 may be substantially the same as the foldable display device 11 described with reference to FIG. 2 except for the eighth window protective layer PL8.

The eighth window protective layer PL8 may be disposed on the first adhesive layer 810. In an embodiment, the eighth window protective layer PL8 may include a plastic film 280, a restoration layer 180, and a hard coating layer 380. The restoration layer 180 may include a plurality of first soft sub-patterns 181, a plurality of first hard sub-patterns 182, a plurality of second soft sub-patterns 183, and a plurality of second hard sub-patterns 184.

The plastic film 280 may be disposed on the first adhesive layer 810 and may protect the window WIN. In an embodiment, the plastic film 280 may include a polymer resin. In an embodiment, for example, the plastic film 280 may include colorless polyimide, polyethylene terephthalate ("PET"), polyimide ('PI"), polyethersulfone ("PS"), polyacrylate ("PAR"), polyetherimide ("PEI"), polyethylene naphthalate ("PEN"), polyphenylene sulfide ("PPS"), polycarbonate ("PC") or the like.

The restoration layer 180 may be disposed on the plastic film 280. In an embodiment, the restoration layer 180 may include the first soft sub-patterns 181 overlapping or corresponding to the folding area FA, the first hard sub-patterns 182 overlapping or corresponding to the folding area FA, the second soft sub-patterns 183 overlapping or corresponding to the planar area PA, and the second hard sub-patterns 184 overlapping or corresponding to the planar area PA. The rigidities of the first and second hard sub-patterns 182 and 184 may be greater than the rigidities of the first and second soft sub-patterns 181 and 183. In addition, the rigidity of the first hard sub-patterns 182 may be substantially the same as the rigidity of the second hard sub-patterns 184.

The first and second soft sub-patterns 181 and 183 may have a self-healing function. In an embodiment, the first and second soft sub-patterns 181 and 183 may include a polymer resin. In an embodiment, for example, the first and second soft sub-patterns 181 and 183 may include polyurethane ("PU"), thermoplastic polyurethane ("TPU"), silicone (Si), polydimethyl acrylamide ("PDMA") or the like. The first and second hard sub-patterns 182 and 184 may include a material having the rigidity greater than the rigidity of the first and second soft sub-patterns 181 and 183. In an embodiment, for example, the first and second hard sub-patterns 182 and 184 may include the same material as the hard coating layer 380.

As the restoration layer 180 includes the first and second soft sub-patterns 181 and 183, the foldable display device 18 may be smoothly folded. In addition, as the restoration layer 180 includes the first and second hard sub-patterns 182 and 184, the wear resistance of the eighth window protective layer PL8 may be improved.

The hard coating layer 380 may be disposed on the restoration layer 180 and may have relatively high rigidity. In an embodiment, for example, the water contact angle of the hard coating layer 380 may be greater than about 95 degrees.

In an embodiment, the hard coating layer 380 may include a silicone resin and a metal oxide. In detail, the metal oxide may be combined with the silicone resin. In an embodiment, for example, the silicone resin may be silsesquioxane ("SSQ") such as hydrogen silsesquioxane ("HSQ") and methylsilsesquioxane ("MSQ"). In addition, the metal oxide may include aluminum oxide ($Al_2O_3$), silicon dioxide ($SiO_2$), indium tin oxide ("ITO"), fluorine doped tin oxide ("FTO"), antimony tin oxide ("ATO"), aluminum zinc oxide ("AZO") or the like. In addition, the hard coating layer 380 may be an anti-fingerprint layer.

In an embodiment, within the hard coating layer 380, a content of the metal oxide relative to a total content of the hard coating layer 380 may be greater than about 0.5 wt % and less than about 5 wt %. As the content of the metal oxide increases, the rigidity of the hard coating layer 380 may increase. However, as the content of the metal oxide increases, a haze of the hard coating layer 380 may also increase. Accordingly, the content of the metal oxide may be set in consideration of the rigidity of the hard coating layer 380 and the haze of the hard coating layer 380.

In an embodiment, the first thickness TH1 of the restoration layer 180 may be about 40 um, the second thickness TH2 of the plastic film 280 may be about 40 um, and the third thickness TH3 of the hard coating layer 380 may be about 5 um.

The foldable display device 18 may include the eighth window protective layer PL8 that protects the window WIN. The eighth window protective layer PL8 may include the plastic film 280, the restoration layer 180 disposed on the plastic film 280, and the hard coating layer 380 disposed on the restoration layer 180. As the eighth window protective layer PL8 includes the plastic film 280, the window WIN may be protected. In addition, as the eighth window protective layer PL8 includes the restoration layer 180, the restoration force of the plastic film 280 may be improved against external forces such as stamping. In addition, as the eighth window protective layer PL8 includes the hard coating layer 380, the wear resistance of the eighth window protective layer PL8 may be improved. In addition, as the restoration layer 180 includes the first and second soft sub-patterns 181 and 183, the foldable display device 18 may be smoothly folded. In addition, as the restoration layer 180 includes the first and second hard sub-patterns 182 and 184, the wear resistance of the eighth window protective layer PL8 may be improved.

Although embodiments and implementations have been described herein, other embodiments and modifications will be apparent from this description. Accordingly, the invention is not limited to such embodiments, but rather to the broader scope of the appended claims and various obvious modifications and equivalent arrangements as would be apparent to a person of ordinary skill in the art.

What is claimed is:

1. A foldable display device comprising:

a display panel including a folding area at which the display panel is foldable, and a non-folding area which is adjacent to the folding area along a first direction;

a window facing the display panel; and a window protective layer which faces the display panel with the window therebetween and is defined by a stack of three consecutive layers, wherein among the stack of three consecutive layers:

a layer having a silicone resin and a metal oxide faces the folding area and the non-folding area of the display panel and has a rigidity;

a plastic film faces the folding area and the non-folding area of the display panel, the plastic film being continuously disposed in the folding area;

a shape-restoration layer is in the folding area and the non-folding area and is between the plastic film and the layer having the silicone resin and the metal oxide, the shape-restoration layer in the folding area including only a soft member which has a rigidity smaller than the rigidity of the layer having the silicone resin and the metal oxide; and the layer having the silicone resin and the metal oxide is furthest from the display panel and defines an outer layer of the foldable display device, wherein the shape-restoration layer further includes a bard pattern which corresponds to the non-folding area, is coplanar with the soft member, and has a rigidity, and wherein the hard pattern is disposed within the shape-restoration laver, is separated from the layer having the silicone resin and the metal oxide, and includes a same material as the layer having the silicone resin and the metal oxide.

2. The foldable display device of claim 1, wherein within the shape-restoration layer, the soft member includes a polymer resin.

3. The foldable display device of claim 1, wherein within the window protective layer, the plastic film includes a polymer resin.

4. The foldable display device of claim 1, wherein the window includes a colorless polyimide.

5. The foldable display device of claim 1, further comprising in order from the display panel, in a direction away from the window:

a protective film facing the display panel;

a buffer member; and a support member.

6. The foldable display device of claim 1, further comprising adhesive layers which face the stack of three consecutive layers, the adhesive layers comprising:

a first adhesive layer which attaches the display panel to the window, and a second adhesive layer which attaches the window to the window protective layer at the plastic film of the stack of three consecutive layers.

7. A foldable display device comprising:

a display panel including a folding area at which the display panel is foldable, and a non-folding area which is adjacent to the folding area along a first direction;

a window facing the display panel;

a window protective layer which faces the display panel with the window therebetween and is defined by a stack of three consecutive layers, wherein among the stack of three consecutive layers:

a layer having a silicone resin and a metal oxide faces the folding area and the non-folding area of the display panel and has a rigidity;

a plastic film faces the folding area and the non-folding area of the display panel, the plastic film being continuously disposed in the folding area;

a shape-restoration layer is in the folding area and the non-folding area and is between the plastic film and the layer having the silicone resin and the metal oxide, the shape-restoration layer including a soft pattern having a rigidity and provided in plural including first soft sub-patterns which are arranged along the folding area; and the layer having the silicone resin and the metal oxide is furthest from the display panel and defines an outer layer of the foldable display device, wherein within the shape-restoration layer, the rigidity of the soft pattern which is provided in plural is less than the rigidity of the layer having the silicone resin and the metal oxide, wherein the shape-restoration layer further includes:

a hard pattern which corresponds to the non-folding area, is coplanar with the soft pattern, and has a rigidity, and hard sub-patterns which are arranged along the folding area to alternate with the first soft sub-patterns and have a rigidity, and wherein the hard patter and the bard sub-patterns are disposed within the shape-restoration layer, are separated from the layer having the silicone resin and the metal oxide, and include a same material as the layer having the silicone resin and the metal oxide.

8. The foldable display device of claim 7, wherein within the shape-restoration layer, the soft pattern includes a polymer resin.

9. The foldable display device of claim 7, wherein within the window protective layer, the plastic film includes a polymer resin.

10. The foldable display device of claim 7, further comprising adhesive layers which face the stack of three consecutive layers, the adhesive layers comprising:

a first adhesive layer which attaches the display panel to the window, and a second adhesive layer which attaches the window to the window protective layer and contacts the window protective layer at the plastic film which is continuously disposed in the folding area.

* * * * *